US012703283B2

(12) United States Patent
Mansouri et al.

(10) Patent No.: US 12,703,283 B2
(45) Date of Patent: Aug. 11, 2026

(54) STRUCTURAL SEAT BACK SHROUD

(71) Applicants: Safran Seats USA LLC, Gainesville, TX (US); Reza Mansouri, Santa Fe Springs, CA (US); Juan Carlos Adib Audelo Navarro, Chihuahua (MX)

(72) Inventors: Reza Mansouri, Santa Fe Springs, CA (US); Juan Carlos Adib Audelo Navarro, Chihuahua (MX)

(73) Assignee: Safran Seats USA LLC, Gainesville, TX (US)

(*) Notice: Subject to any disclaimer, the term of this patent is extended or adjusted under 35 U.S.C. 154(b) by 228 days.

(21) Appl. No.: 18/035,513

(22) PCT Filed: Mar. 11, 2021

(86) PCT No.: PCT/US2021/022004
§ 371 (c)(1),
(2) Date: May 5, 2023

(87) PCT Pub. No.: WO2022/132210
PCT Pub. Date: Jun. 23, 2022

(65) Prior Publication Data

US 2023/0331128 A1 Oct. 19, 2023

Related U.S. Application Data

(60) Provisional application No. 63/125,925, filed on Dec. 15, 2020, provisional application No. 63/125,909, filed on Dec. 15, 2020.

(51) Int. Cl.
*B60N 2/70* (2006.01)
*B64D 11/06* (2006.01)

(52) U.S. Cl.
CPC ........... *B60N 2/70* (2013.01); *B64D 11/0647* (2014.12)

(58) Field of Classification Search
CPC ........ B60N 2/70; B64D 11/0647; A47C 7/282
(Continued)

(56) References Cited

U.S. PATENT DOCUMENTS 6,059,369 A * 5/2000 Bateson ................ B29C 70/222 297/452.18
6,231,125 B1 * 5/2001 Maeda ................ B60N 2/7011 297/452.56
(Continued)

FOREIGN PATENT DOCUMENTS

DE 102004008408 A1 9/2005
EP 2772434 A2 * 9/2014 ............. B60N 2/565
WO WO-2012169906 A1 * 12/2012 ........... B29C 65/483

OTHER PUBLICATIONS

International Patent Application No. PCT/US2021/022004, International Search Report and Written Opinion, dated Aug. 27, 2021.

*Primary Examiner* — David R Dunn
*Assistant Examiner* — Jessica Kathryn Thompson
(74) *Attorney, Agent, or Firm* — Kilpatrick Townsend & Stockton LLP

(57) ABSTRACT

Described are monocoque seat backs having a structural shroud with a rear panel, a top lip and two side lips positioned along edges of the rear panel to form an interior volume. A mesh suspension system is coupled to the structural shroud and suspended over an opening of the interior volume. In certain embodiments, the structural shroud may be formed of one or more of a composite, a thermoplastic resin, a thermoset resin, or a polyfuryl phenolic resin. The structural shroud is constructed to satisfy 16G criteria and FST criteria.

18 Claims, 7 Drawing Sheets

(58) Field of Classification Search
USPC .................................................. 297/452–480
See application file for complete search history.

(56) References Cited

U.S. PATENT DOCUMENTS

| | | | | |
|---|---|---|---|---|
| 10,477,972 | B2 * | 11/2019 | Su | A47C 7/742 |
| 2004/0099766 | A1 * | 5/2004 | Pratt, Jr. | B64D 11/0649 244/118.6 |
| 2007/0102987 | A1 * | 5/2007 | Chen | A47C 31/02 297/452.56 |
| 2011/0101165 | A1 * | 5/2011 | Fullerton | B64D 11/06 244/122 R |
| 2014/0037927 | A1 * | 2/2014 | Jeunesse | B32B 3/30 428/218 |
| 2014/0239677 | A1 * | 8/2014 | Laib | B64D 11/0626 297/180.1 |
| 2014/0300171 | A1 * | 10/2014 | Velasco | A47C 5/06 297/452.18 |
| 2017/0158104 | A1 * | 6/2017 | Le | B60N 2/809 |
| 2018/0029503 | A1 | 2/2018 | Dhaini | |

* cited by examiner 10
400
200

204
206
100
208
202
110
106

300
304

STRUCTURAL SEAT BACK SHROUD

CROSS REFERENCE TO RELATED APPLICATIONS

This application is related to and claims priority benefits from U.S. Provisional Application Ser. No. 63/125,909 ("the '909 application"), filed on Dec. 15, 2020, entitled STRUCTURAL SEAT BACK SHROUD, and from U.S. Provisional Application Ser. No. 63/125,925 ("the '925 application"), filed on Dec. 15, 2020, entitled STRUCTURAL SEAT BACK SHROUD. The '909 and '925 applications are hereby incorporated in their entireties by this reference.

FIELD OF THE INVENTION

The field of the invention relates to relates to passenger seats or the like, and more particularly to seat back construction.

BACKGROUND

Carrier industries, particularly air carriers, are moving toward passenger seats that are lighter, simpler, and easier to manufacture and assemble. Lighter, more compact seats offer improved fuel economy, increase available payload for passengers and luggage, and allow for extra passenger space in existing seating arrangements or opportunities for more compact seating arrangements while maintaining passenger space at current levels. The passenger seat is also a major design feature and the structure that passengers are most often in contact with during travel. As such, there is a simultaneous push for more visually appealing designs and improved ergonomics and passenger comfort.

Traditional passenger seats 10 are manufactured using various parts and components, as shown in FIG. 1. For example, in a traditional passenger seat back 20, a U-shaped hoop or structural component 30 forms the primary structure, and a diaphragm 40 spans the U to form a secondary structure. The combined structure is then covered by a shroud 50. The shroud 50 forms the literature pocket, monitor surround, back appearance surfaces, etc. and provides a "finished" look to the passenger seat back 20. Finally, cushions cover the front surface of the structure.

These passenger seats 10 must meet FAA regulations (such as Section 25.562), which require the seat to have the necessary integrity to withstand stresses of sixteen times the force of gravity, also known as "16G" seats. Likewise, FAA regulations dictate fire, smoke, and toxicity ("FST") requirements for materials that are used in aircraft interiors. These requirements make up the 16G criteria and the FST criteria, respectively.

Because of these constraints, the structural component 30 was traditionally formed of aluminum or other metals, which are non-flammable and have sufficient structural integrity. While meeting the regulations, such materials are not particularly lightweight. These materials also make it difficult, if not impossible, to include complex curvatures that provide enhanced support for varying passenger physiologies.

The shroud 50 is usually formed of a lightweight plastic material that can be easily molded into the complex shapes described above. The choice of material for the shroud 50 produces a clean, polished surface without the need for significant surface treatment to achieve that appearance.

As composites became available, such as carbon fiber, these materials were adopted in place of metal for the structural component 30. The carbon fiber materials are significantly lighter and cheaper than aluminum, while at the same time providing the same or better structural and flame-retardant qualities. While carbon fiber can be easily substituted in place of aluminum in the structural component 30, it could not be used to replace the plastic material of the shroud 50 because, like aluminum, carbon fiber is not easily molded into the complex shapes needed for the seat back 20.

As a result, efforts continued to develop a material that has the strength and flame-resistance of metal and carbon fiber and the moldability and finish of plastic, which can then be used to form a structural shroud 100 that can replace the conventional structural component 30 and the plastic shroud 50 to form a seat back 20 with complex geometries.

Examples of materials that have been investigated for this purpose include furan and phenolic resins, which have long been solutions for fire-resistant composites. But, these materials have a porosity that requires multiple operations to achieve a good surface finish and also tend to be brittle.

Another example includes snap-cure phenolics developed by FTI (Somerset), which was incorporated into an economy class seat back using a hot press manufacturing method. https://cw.mydigtalpubication.com/publication/?m=59263&i=667219&p=28 (last accessed on Dec. 12, 2020).

Recently, a polyfuryl alcohol ("PFA") phenolic resin prepreg was developed by SHD Composites. The PFA phenolic resin is a thermoset polymer derived from biomass that performs like a phenolic resin (structural stability and fire-resistant), but adds excellent surface processing and sustainability. This material was used to produce a carbon fiber/bioresin composite seat back that is FST and 16G compliant using a compression molding manufacturing method. https://cw.mydigitalpublication.com/publication%?m=59263&i=667219&p=28 (last accessed on Dec. 12, 2020). Compression molding is a molding process in which a thermosetting resin (alone or combined with glass fiber or carbon fiber) is placed in a mold cavity where it is then heated and pressurized. Compression molding is a process that is ideal for large-volume manufacturing applications, but lacks the ability to form complex geometries within the molded component.

The seat back has been incorporated into the Acro Series 6R Seat back, and is now in flight. https://www.insidecomposites.com/supporting-uk-conposites-manufacturing/(last accessed on Dec. 12, 2020). Despite the fact that the composite seat back has an aesthetically-pleasing finished appearance, the Acro Series 6R seat nevertheless includes a separate plastic shroud attached to the composite seat back to provide the complex geometry needed for the various items located on the seat back. https://andrewwolfenden.com/case-study-series-6r-seat/ (last accessed on Dec. 12, 2020).

Thus, there is still a need to develop a seat back 20 formed with a structural shroud 100, which eliminates the structural component 30, yet also meets the 16G and FST requirements, and provides complex geometries and other appealing aesthetics of the seat back 20 surface.

In certain cases, the use of a monocoque structural shroud 100 may facilitate the design of a passenger seat that is lighter, simpler to manufacture, more compact, while still providing excellent passenger comfort and support. In monocoque designs, the outer skin is the primary load-bearing structure. Monocoque seat structures, particularly seat backs, may provide additional design freedom as compared with traditional seat frame constructions. Monocoque seat structures allow for more freedom in aesthetic design, more complex curvatures for ergonomic support, and more internal space that may be used for locating tray tables, storage pockets, and internal passenger suspension cushions, which would otherwise be too bulky or impossible to fit to existing seat structures.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

According to certain embodiments, a monocoque seat back comprises a structural shroud comprising a rear panel, a top lip and two side lips positioned along edges of the rear panel to form an interior volume, and a mesh suspension system coupled to the structural shroud and suspended over an opening of the interior volume.

In some embodiments, the mesh suspension system extends into the interior volume when compressed. The mesh suspension system may be coupled to the structural shroud by at least one of sonic welding, friction welding, mechanical fasteners, or chemical fasteners.

According to some embodiments, the monocoque seat back further comprises a cellular cushion positioned within the interior volume. The cellular cushion may have a variable cell size, variable cell height, and/or a variable cell wall thickness. The cellular cushion may further comprise at least one of a honeycomb cell, a square cell, or a circular cell.

In certain embodiments, the structural shroud may comprise a composite, a thermoplastic resin, a thermoset resin, and/or a polyfuryl phenolic resin.

According to some embodiments, the structural shroud satisfies 16G criteria and/or FST criteria.

In some embodiments, the monocoque seat back further comprises a stowage pocket integrally formed with the structural shroud and/or a monitor surround integrally formed with the structural shroud.

In further embodiments, the structural shroud is formed by compression molding and/or by injection molding.

DETAILED DESCRIPTION

Figure 1:
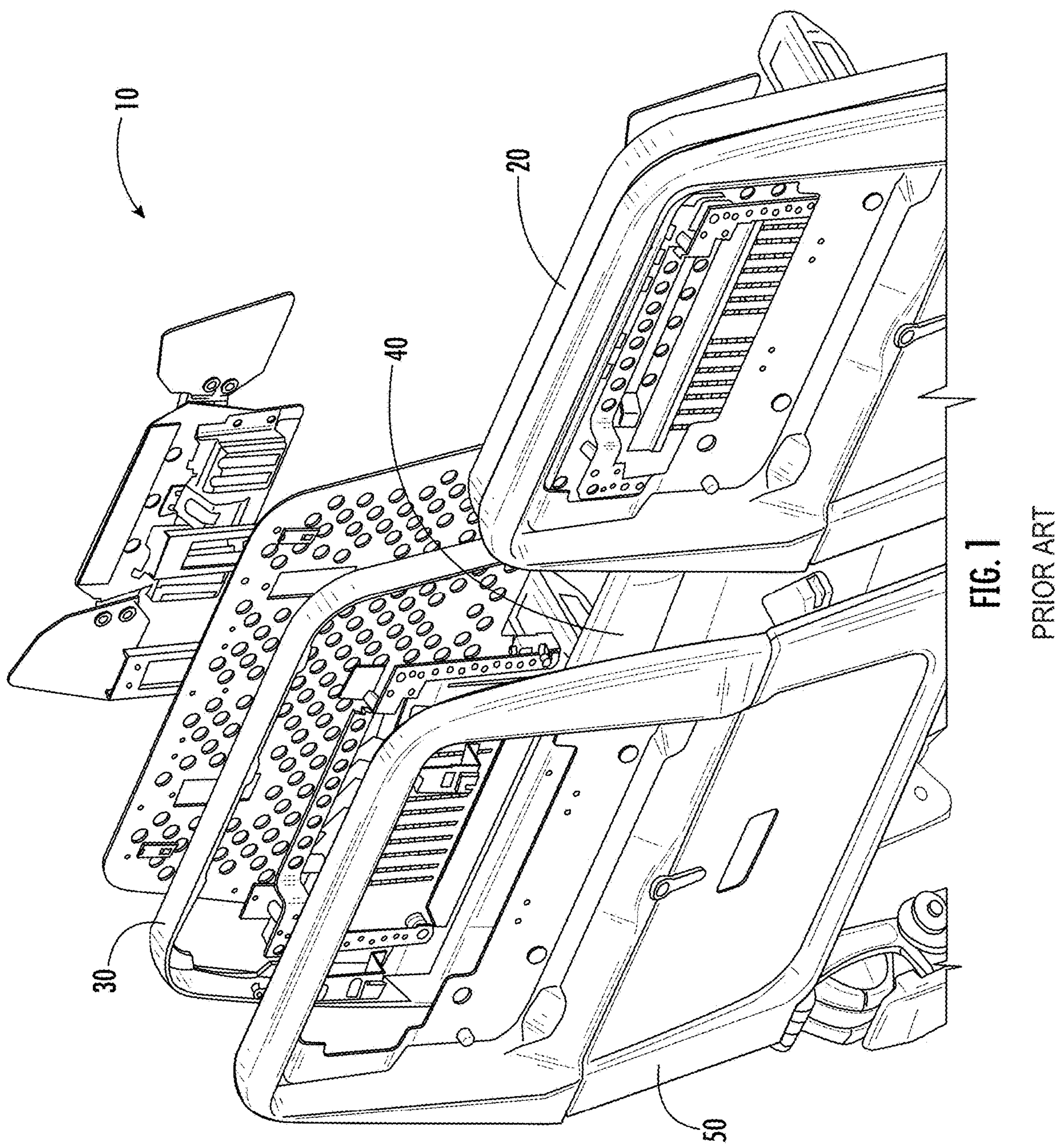
FIG. 1 is an exploded view of a conventional seat back.

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

As best illustrated in FIGS. 2-5, described embodiments of the invention provide a seat back 20 comprising a structural shroud 100, a mesh suspension system 200, and a headrest 400. The structural shroud 100 may be constructed without any internal framing, as the structural shroud 100 is the main load bearing structure of the seat back 20.

The structural shroud 100 may be molded, formed, or otherwise made with complex shapes, curvatures, and structures to provide additional support, attachment points, storage areas, or other features. In certain embodiments, the structural shroud 100 may include an integrated stowage pocket 102 and/or an integrated monitor surround 104 formed by the particular shaping of the structural shroud 100.

In certain aspects, the structural shroud 100 is an improvement over the monocoque passenger seat backs described in WO2015/191709, published on Dec. 17, 2015, the entire contents of which is incorporated herein by this reference. For example, the monocoque seat back described therein utilizes a forward panel affixed to an aft panel to provide the necessary structural integrity to the seat back in lieu of a traditional structural component 30. In these designs, the dual panels (aka the "clamshell" design) are needed to provide the necessary structural support in the absence of the structural component 30 because the materials available at the time to form the aft panel with the necessary complex geometry could not also provide a seat back that would satisfy the FST and 16G criteria.

Figure 2:
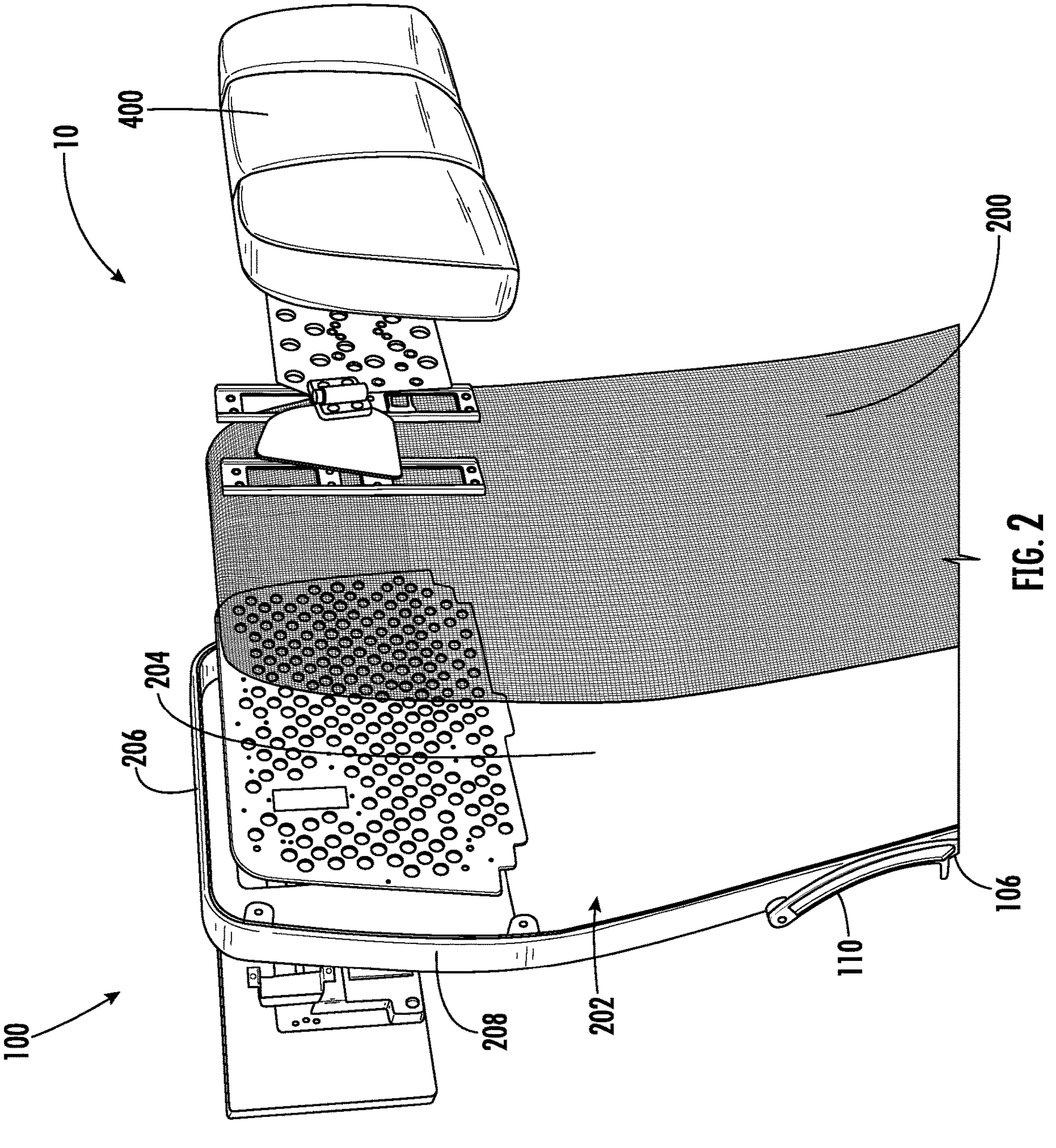
FIG. 2 is an exploded view of a structural shroud incorporated into a monocoque seat back, according to certain embodiments of the present invention.
Figure 3:
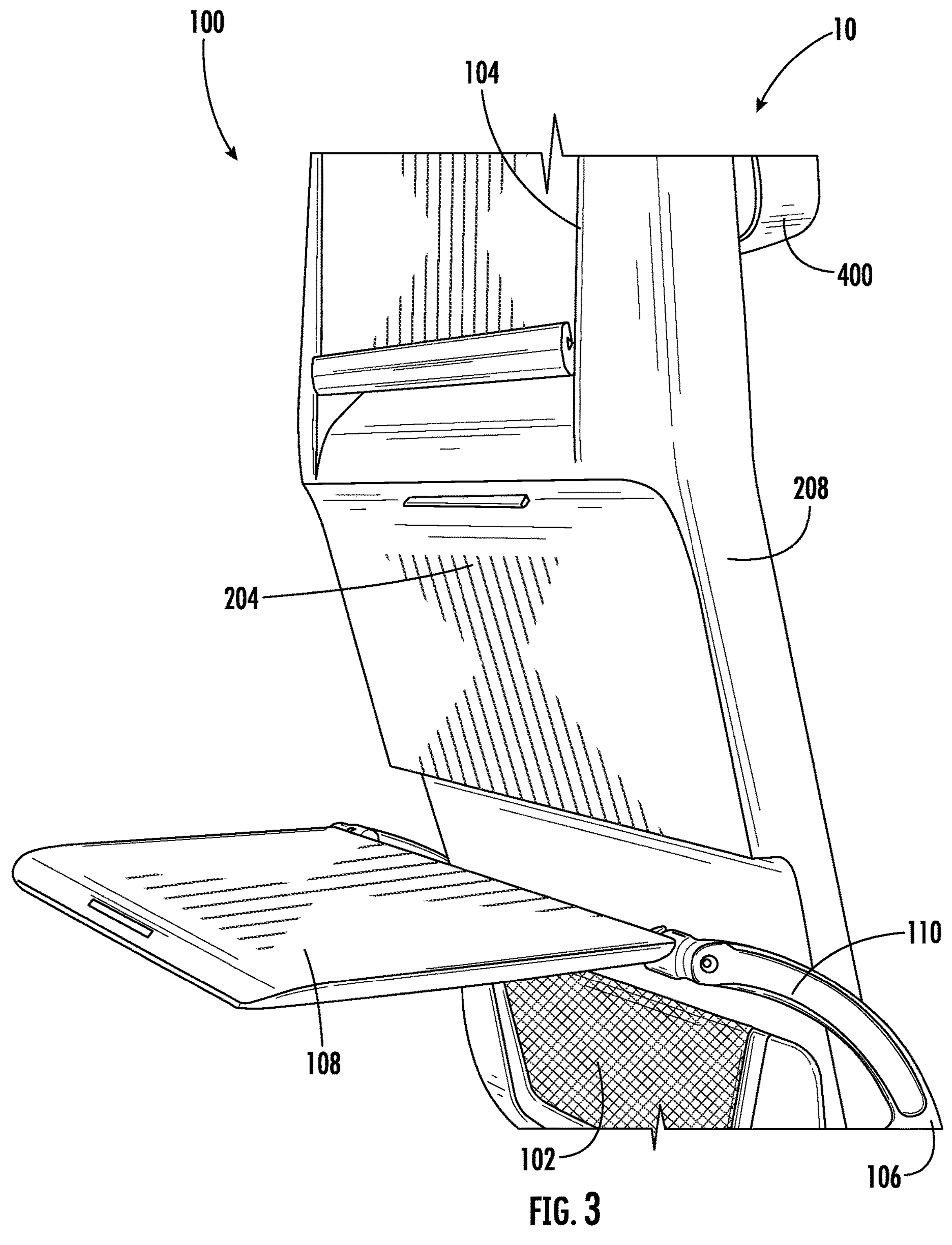
FIG. 3 is a rear perspective view of the structural shroud incorporated into a monocoque seat back of FIG. 1 with the tray table deployed.
Figure 4:
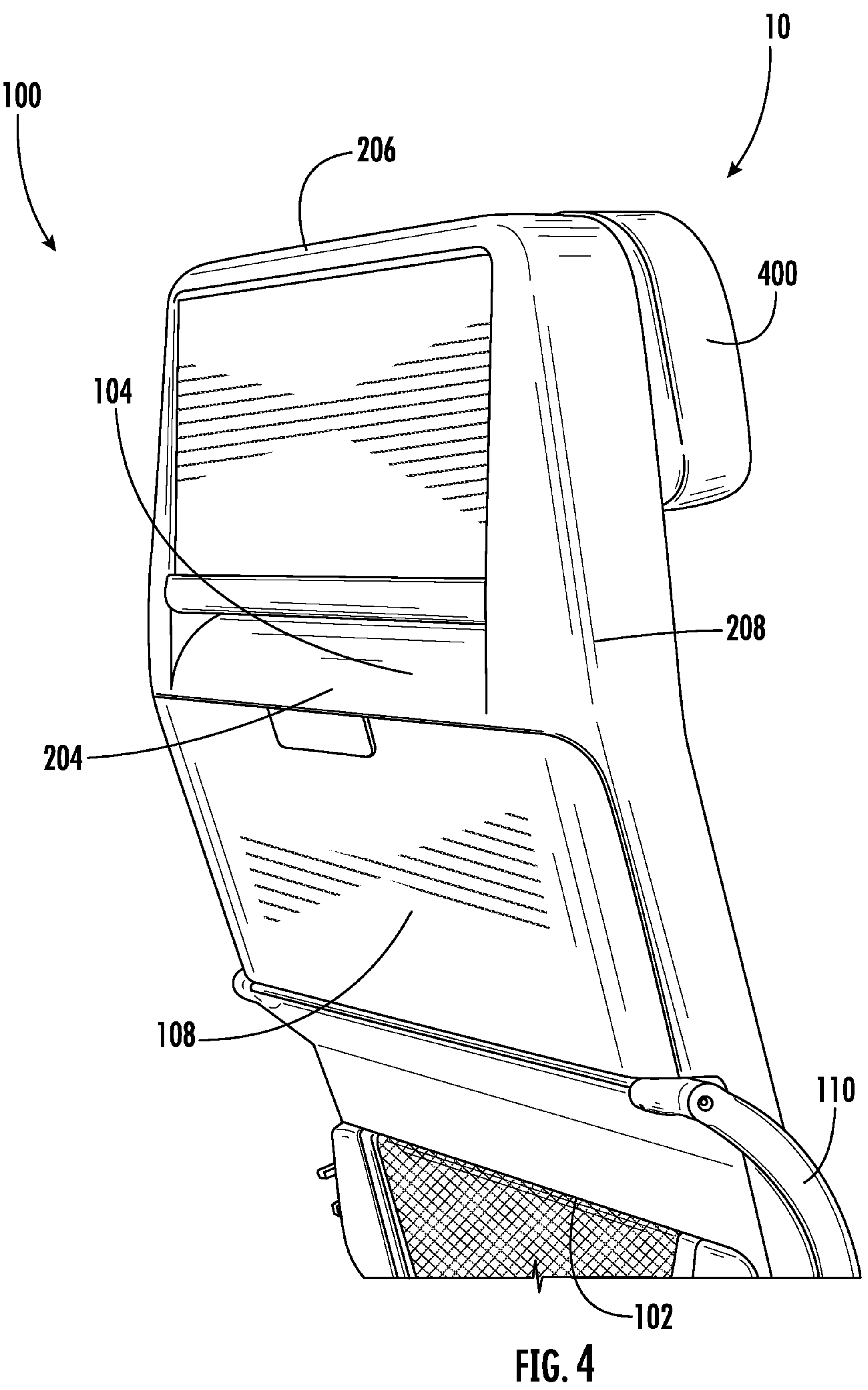
FIG. 4 is a rear perspective view of the structural shroud incorporated into a monocoque seat back of FIG. 1 with the tray table stowed.

As illustrated in FIGS. 2-4, the structural shroud 100 may be molded with attachment points 106 or integrated hardware to facilitate the attachment of a tray table 108 directly to the structural shroud 100 without the need for additional parts or fasteners to hold the tray table 108 in a stowed position. Furthermore, the interior volume 202 may provide for a location for the tray table arms 110, stop mechanism (not shown), and any associated hardware.

Likewise, the structural shroud 100 may be molded with attachment points or integrated hardware to facilitate the attachment of arm rests directly to the structural shroud 1X), thereby reducing parts and weight. The structural shroud 100 may also be formed as a load-bearing structure to support a load of a seat pan (not shown).

As discussed above, the structural shroud 100 may be formed of a variety of materials, including but not limited to fiber reinforced plastics, composites, carbon fiber, polycarbonate, polypropylene, plastics, thermoset resins, thermoplastic resins, other polymers, other suitable materials, or any combination thereof that may be molded into the complex geometrical shapes needed and still satisfy FST and 16G regulations. Such a result may be achieved by the use of an injection or compression molding process in combination with specially-formulated resins that provide the necessary properties for a structural shroud 100. In certain embodiments, the structural shroud 100 is formed using a PFA phenolic resin, which has been certified to satisfy the 16G and FST standards, as well as adding excellent surface processing and sustainability.

According to certain embodiments, the surface of the structural shroud 100 may be treated with PC sheets, which are lighter than an injection molded plastic part. Such aesthetic foils like Aerfilm or the latest developments in composites such as resin transfer molding combined with high-pressure resin transfer molding have proven to provide composite surfaces that are suitable for A-surface finish.

Mesh Suspension System

Figure 5:
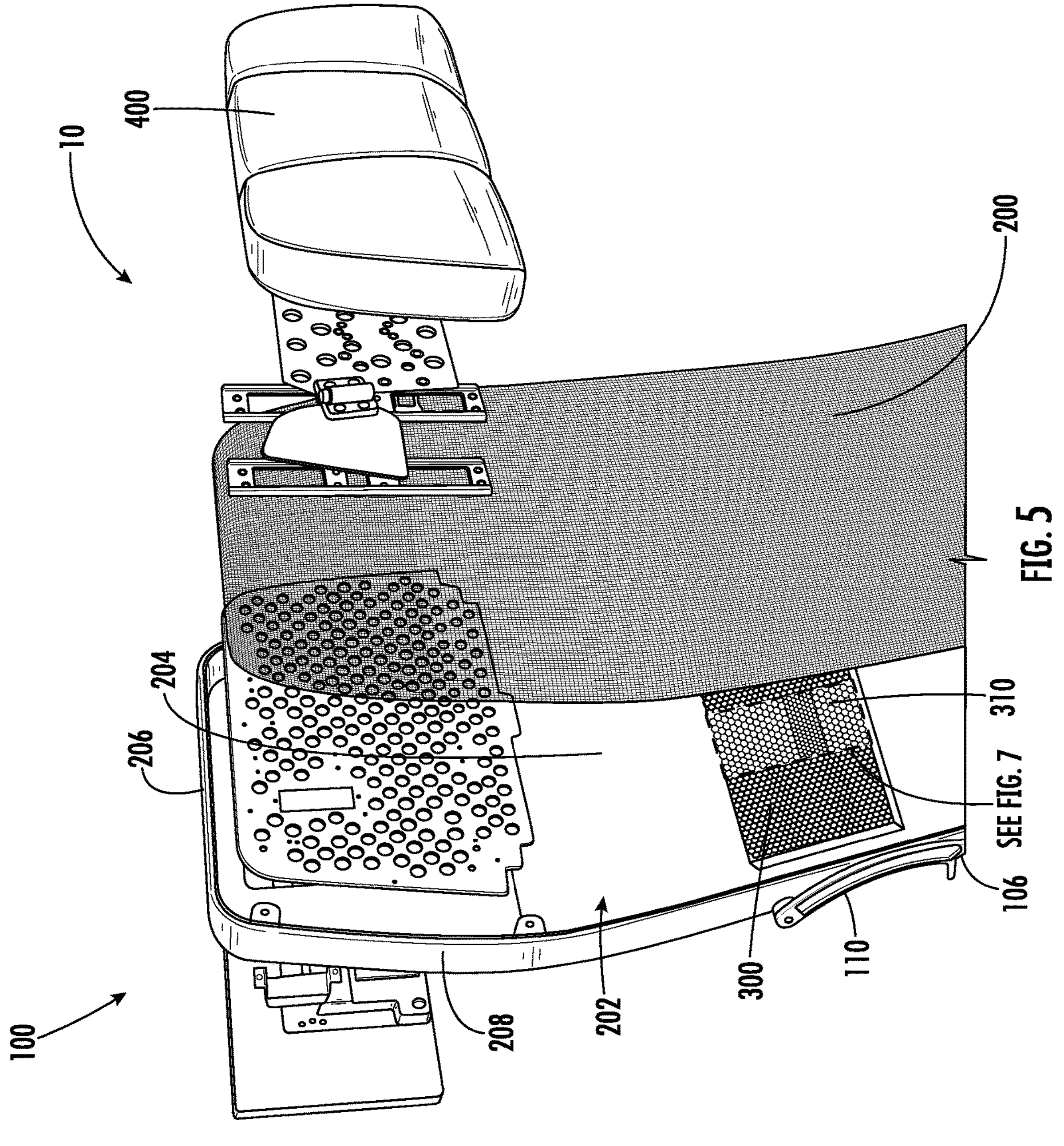
FIG. 5 is an exploded view of a structural shroud incorporated into a monocoque seat back of FIG. 1 with a cellular cushion included.

In certain embodiments, the mesh suspension system 200 replaces the hard front surface of the forward panel of the earlier monocoque seat back design described above. In some embodiments, as shown in FIGS. 2 and 5, the mesh suspension system 200 includes a mesh surface and forms the front surface of the structural shroud 100 that contacts a passenger's back when the passenger is seated in the passenger seat 10. In other embodiments, additional cushions may be positioned in front of and attached to the structural shroud 100 and/or the mesh suspension system 200 to provide additional comfort to the passenger's back.

In some cases, an interior volume 202 is located between the structural shroud 100 and the mesh suspension system 200. The interior volume 202 may be defined by a rear panel 204, a top lip 206, and two side lips 208. The lips 206, 208 extend toward the front of the seat and are arranged along top and side edges of the rear panel 204.

This interior volume 202 may be used for storage, internal wiring, or the concealment of other components related to or affixed to the passenger seat 10. In certain embodiments, the internal volume 202 may be filled with a foam or foam-like material to facilitate floating in an emergency or to provide additional strength to the seat back 20.

When the mesh suspension system 200 is installed onto the structural shroud 100, the mesh suspension system 200 may be affixed to the structural shroud 100 and/or to the lips 206, 208 with mechanical fasteners such as screws, bolts, rivets, or the like, or it may be bonded with adhesives, epoxy, glue, or another bonding agent. In certain embodiments, the mesh suspension system 200 may be sonically or friction welded to the structural shroud 100. The resulting seat back 20 may be lighter, more compact, simpler to produce, and eliminate the need for springs or other support mechanisms. After assembly, the seat back 20 may be upholstered with fabric and cushions as desired or required for additional comfort and aesthetic appearances.

In further embodiments, the mesh suspension system 200 may extend or deflect into the interior volume 202. The deflection of the mesh suspension system 200 provides two different types of cushioning. The compression of the mesh suspension system 200 is complemented by its deflection into the interior volume 202.

The mesh suspension system 200 may also provide additional means for adjusting the cushioning provided to a passenger at different areas of the structural shroud 100 and/or through use of a cellular cushion 300, as described in more detail below. The extra space contained within the interior volume 202, particularly in combination with a mesh suspension system 200 and/or cellular cushion 300, may also enhance passenger comfort by improving air circulation around the passenger, thereby reducing the buildup of heat and moisture.

Furthermore, the mesh suspension system 200 may be formed as a flat or planar sheet, or it may be molded, formed, or otherwise manufactured with curved or irregular shapes. The mesh suspension system 200 may be formed, molded, or otherwise made from any number of materials including, but not limited to, elastomers, polymers, and/or natural materials. The selection of a suitable material will depend upon the geometry of the mesh suspension system 200, including the intended design loads, desired manufacturing processes, and any applicable regulatory requirements.

Cellular Cushion

Figure 6:
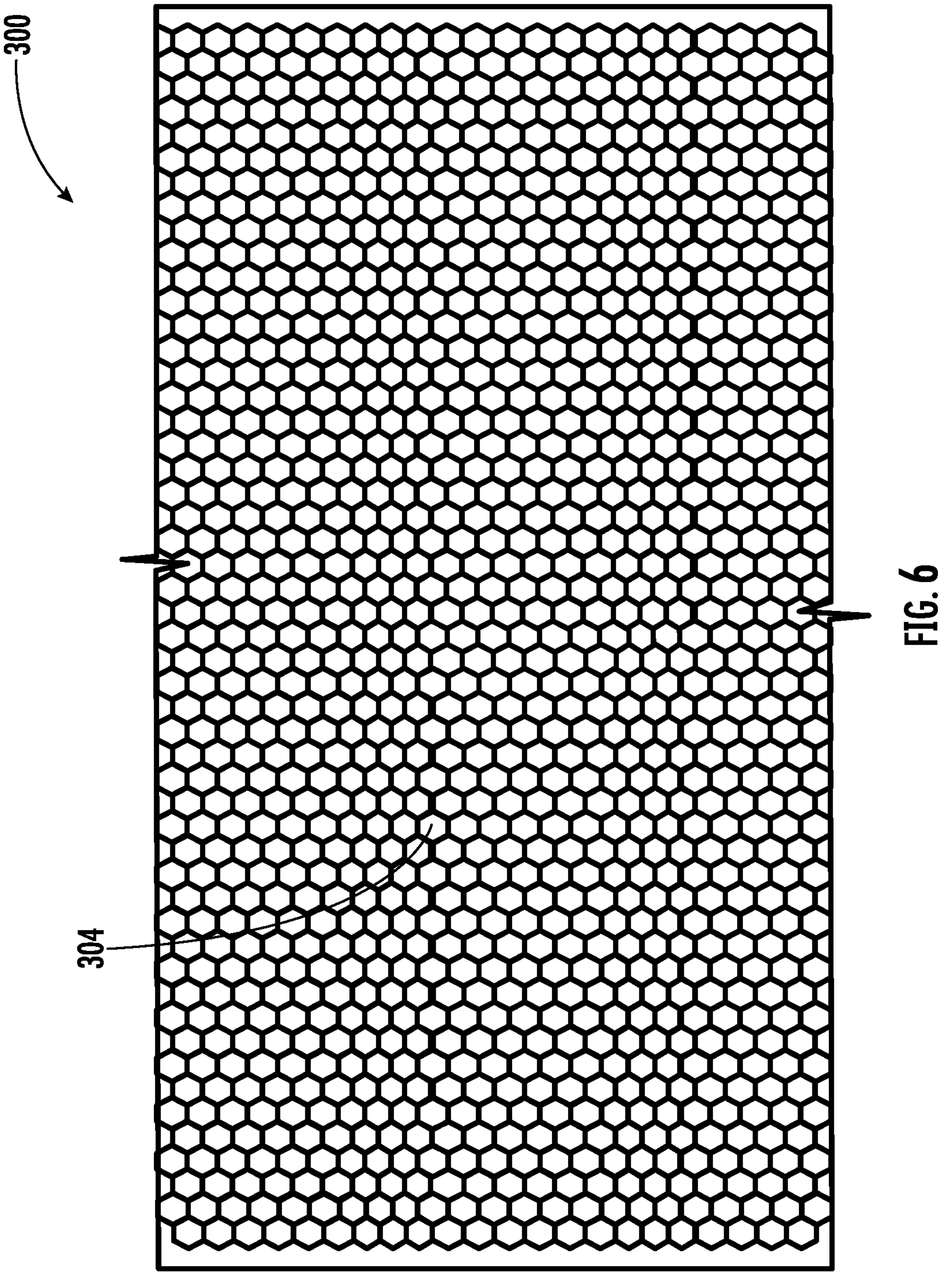
FIG. 6 is a top view of the cellular cushion of FIG. 5.
Figure 7:
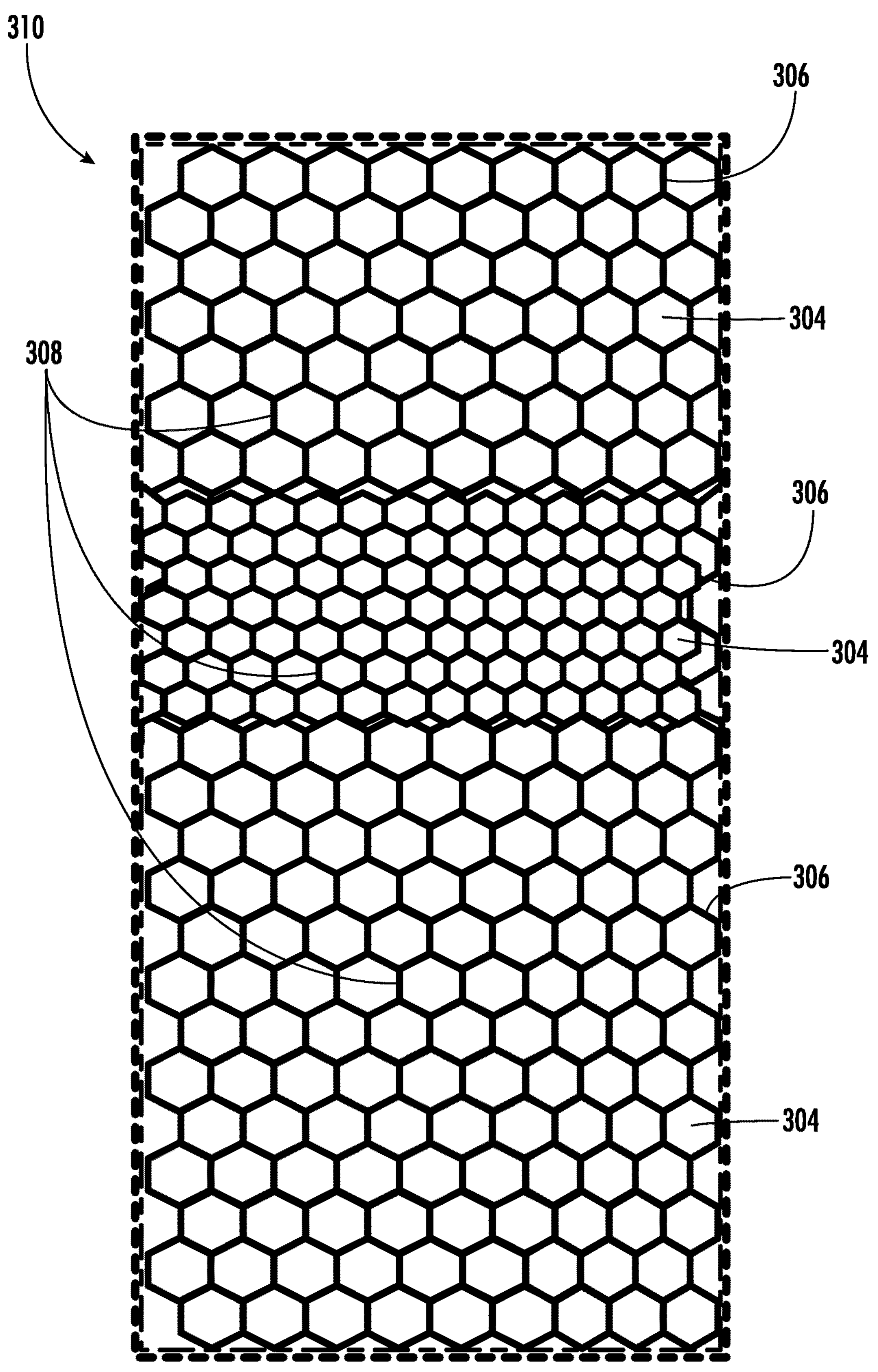
FIG. 7 is a top view of a portion of the lumbar support of the cellular cushion of FIG. 5.

In some embodiments, as shown in FIGS. 5-7, a cellular cushion 300 may be positioned within the interior volume 202. The cellular cushion 300 is made up of a plurality of cells 304 that are defined by cell walls 306. The cells 304 allow for the cellular cushion 300 to have a combination of properties, including anisotropic cushioning and stretch properties. For instance, by varying the size and shape of the cells 304 or the cell wall 306 thickness, the cellular cushion 300 may have its properties tailored to a specific application. The cellular cushion 300 also comprises a thickness 308, which may be increased or decreased to vary the amount of cushion, support, or strength of the overall cellular cushion 300.

As best illustrated in FIG. 7, the properties of the cellular cushion 300 may be varied across the surface of the cellular cushion 300. For instance, one portion of the cellular cushion 300 may have very small cells 304 or thicker cell walls 306 to increase the relative stiffness of that area of the cellular cushion 300, as compared to another portion with larger cells 304 and/or thinner cell walls 306. Similarly, the stiffness of the cellular cushion 300 may vary depending on the direction of force applied to the cellular cushion 300. In certain embodiments, the stiffness or compliance of the cellular cushion 300 to a force applied perpendicular to the thickness 308 may be different than the stiffness or compliance of the cellular cushion 300 to a force applied in the plane of the thickness 308 of the cellular cushion 300.

The variation in properties of the cellular cushion 300 may be used to alter the amount of cushion, stiffness, and/or flexibility in different directions to provide enhanced comfort for a passenger seated in the passenger seat 10. For example, the cellular cushion 300 may comprise a lumbar support 310 configured to provide additional cushioning and support for a passenger. The lumbar support 310, which may be a passive pad or an inflatable bladder, is at least partially located within the cellular cushion 300. The cellular cushion 300 may have specific sizing of the cells 304 and cell walls 306 to provide for passive alignment of the lumbar support 310 so that it may self-position to fit persons falling within the fifth to ninety-fifth statistical percentile for body size or shape.

In certain embodiments, the lumbar support 310 may be configured to only slightly resist vertical or horizontal movement as a passenger sits on the cellular cushion 300. However, while the cellular cushion 300 allows vertical and horizontal translation of the lumbar support 310, it may provide a higher level of support or resistance in a direction perpendicular to the lumbar support 310. In some embodiments, the shape of the cells 304 may also be changed to provide different cushioning properties. Hexagonal, circular, and/or square shaped cells 304 may be used. In certain embodiments, other shapes, both regular and irregular, may be used to change or optimize the properties of the cellular cushion 300.

Referring to FIGS. 5-7, a cellular cushion may offer a number of improvements or advantages over alternative supporting methods. The cellular cushion 300 allows for airflow through the cells 304, which improves air circulation around the passenger, thereby reducing the buildup of heat and moisture. The cellular cushion 300 may also provide for a lighter, more compact seating arrangement. In certain embodiments, the cellular cushion 300 may be suspended within the interior volume 202 such that only the perimeter of the cellular cushion 300 is attached to the structural shroud 100. The balance of the cellular cushion 300 is then free to deflect as it supports the load of a passenger. A suspended cellular cushion 300 also provides a dual cushioning method. A passenger may be supported and cushioned both by the deflection of the cellular cushion 300 and by the compression of the cellular cushion itself.

Furthermore, the cellular cushion 300 may be formed as a flat or planar sheet, or it may be molded, formed, or otherwise manufactured with curved or irregular shapes. The cellular cushion 300 may be formed, molded, or otherwise made from any number of materials including, but not limited to, elastomers, polymers, and/or natural materials. The selection of a suitable material will depend upon the geometry of the cellular cushion 300, including the geometry, size, and distribution of the cells 304 and cell walls 306, the intended design loads, desired manufacturing processes, and any applicable regulatory requirements. The cellular cushion 300 is preferably made from a material that resists permanent deformation even under large displacements and repeated use.

In the following, further examples are described to facilitate the understanding of the invention:

Example A. A monocoque seat back comprising:
- a structural shroud comprising a rear panel;
- a top lip and two side lips positioned along edges of the rear panel to form an interior volume; and
- a mesh suspension system coupled to the structural shroud and suspended over an opening of the interior volume.

Example B. The monocoque seat back of any of the preceding or subsequent examples, wherein the mesh suspension system extends into the interior volume when compressed.

Example C. The monocoque seat back of any of the preceding or subsequent examples, wherein the mesh suspension system is coupled to the structural shroud by at least one of sonic welding, friction welding, mechanical fasteners, or chemical fasteners.

Example D. The monocoque seat back of any of the preceding or subsequent examples, further comprising a cellular cushion positioned within the interior volume.

Example E. The monocoque seat back of any of the preceding or subsequent examples, wherein the cellular cushion comprises a variable cell size.

Example F. The monocoque seat back of any of the preceding or subsequent examples, wherein the cellular cushion comprises a variable cell height.

Example G. The monocoque seat back of any of the preceding or subsequent examples, wherein the cellular cushion comprises a variable cell wall thickness.

Example H. The monocoque seat back of any of the preceding or subsequent examples, wherein the cellular cushion comprises at least one of a honeycomb cell, a square cell, or a circular cell.

Example I. The monocoque seat back of any of the preceding or subsequent examples, wherein the structural shroud comprises a composite.

Example J. The monocoque seat back of any of the preceding or subsequent examples, wherein the structural shroud comprises a thermoplastic resin.

Example K. The monocoque seat back of any of the preceding or subsequent examples, wherein the structural shroud comprises a thermoset resin.

Example L. The monocoque seat back of any of the preceding or subsequent examples, wherein the structural shroud comprises a polyfuryl phenolic resin.

Example M. The monocoque seat back of any of the preceding or subsequent examples, wherein the structural shroud satisfies 16G criteria.

Example N. The monocoque seat back of any of the preceding or subsequent examples, wherein the structural shroud satisfies FST criteria.

Example O. The monocoque seat back of any of the preceding or subsequent examples, further comprising a stowage pocket integrally formed with the structural shroud.

Example P. The monocoque seat back of any of the preceding or subsequent examples, further comprising a monitor surround integrally formed with the structural shroud.

Example Q. The monocoque seat back of any of the preceding or subsequent examples, wherein the structural shroud is formed by compression molding.

Example R. The monocoque seat back of any of the preceding or subsequent examples, wherein the structural shroud is formed by injection molding.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications may be made without departing from the scope of the claims below.

That which is claimed is:

1. A monocoque seat back comprising:
- a structural shroud comprising a rear panel, a top lip, and two side lips, the top lip and two side lips positioned along edges of the rear panel and extending forward to form an interior volume of the structural shroud, wherein the rear panel, the top lip, and the two side lips are formed of a single, continuous material; and
- a mesh suspension system comprising a mesh surface directly connected to the structural shroud and suspended over an opening of the interior volume.

2. The monocoque seat back of claim 1, wherein the mesh suspension system extends into the interior volume when compressed.

3. The monocoque seat back of claim 1, wherein the mesh suspension system is coupled to the structural shroud by at least one of sonic welding, friction welding, mechanical fasteners, or chemical fasteners.

4. The monocoque seat back of claim 1, wherein the structural shroud comprises a composite.

5. The monocoque seat back of claim 1, wherein the structural shroud comprises a thermoplastic resin.

6. The monocoque seat back of claim 1, wherein the structural shroud comprises a thermoset resin.

7. The monocoque seat back of claim 1, wherein the structural shroud comprises a PFA phenolic resin.

8. The monocoque seat back of claim 1, wherein the structural shroud satisfies 16G criteria of FAA regulation 14 C.F.R. 25.562.

9. The monocoque seat back of claim 1, further comprising a stowage pocket integrally formed with the structural shroud.

10. The monocoque seat back of claim 1, further comprising a monitor surround integrally formed with the structural shroud.

11. The monocoque seat back of claim 1, wherein the structural shroud is formed by compression molding.

12. The monocoque seat back of claim 1, wherein the structural shroud is formed by injection molding.

13. A monocoque seat comprising:

a structural shroud comprising a rear panel, a top lip, and two side lips, the top lip and two side lips positioned along edges of the rear panel and extending forward to form an interior volume of the structural shroud, wherein the rear panel, the top lip, and the two side lips are formed of a single, continuous material;

a mesh suspension system comprising a mesh surface directly connected to the structural shroud and suspended over an opening of the interior volume; and a cellular cushion positioned within the interior volume between the rear panel and the mesh surface of the mesh suspension system.

14. The monocoque seat back of claim 13, wherein the cellular cushion comprises a variable cell size.

15. The monocoque seat back of claim 13, wherein the cellular cushion comprises a variable cell height.

16. The monocoque seat back of claim 13, wherein the cellular cushion comprises a variable cell wall thickness.

17. The monocoque seat back of claim 13, wherein the cellular cushion comprises at least one of a honeycomb cell, a square cell, or a circular cell.

18. A monocoque seat back comprising:

a structural shroud comprising a rear panel, a top lip, and two side lips, the top lip and two side lips positioned along edges of the rear panel and extending forward relative to the rear panel, wherein an aft side of the rear panel forms an aft surface of the seat back, and wherein a forward side of the panel, the top lip, and the two side lips together form an interior volume of the structural shroud, wherein the rear panel, the top lip, and the two side lips are formed of a single, continuous material and the structural shroud further comprises a tray table attachment point integrated into at least one of the two side lips;

a tray table directly attached to the structural shroud at the tray table attachment point;

a mesh suspension system comprising a mesh surface directly connected to the structural shroud and suspended over an opening of the interior volume; and a cellular cushion positioned within the interior volume between the rear panel and the mesh surface of the mesh suspension system.

* * * * *